US007778421B2

(12) United States Patent
Bellwood et al.

(10) Patent No.: US 7,778,421 B2
(45) Date of Patent: Aug. 17, 2010

(54) METHOD FOR CONTROLLING ACCESS TO ENCRYPTED CONTENT USING MULTIPLE BROADCAST ENCRYPTION BASED CONTROL BLOCKS

(75) Inventors: Thomas A. Bellwood, Austin, TX (US); Matt F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 11/673,614

(22) Filed: Feb. 12, 2007

(65) Prior Publication Data
US 2008/0192936 A1 Aug. 14, 2008

(51) Int. Cl.
*H04L 9/00* (2006.01)
*G06F 11/30* (2006.01)
(52) U.S. Cl. ................ 380/277; 173/193; 173/194; 726/30; 726/31; 726/32; 726/33
(58) Field of Classification Search .............. 380/277
See application file for complete search history.

(56) References Cited

U.S. PATENT DOCUMENTS

| 7,412,063 B2 * | 8/2008 | Jung et al. ............ 380/281 |
| 2003/0198351 A1 * | 10/2003 | Foster et al. ........... 380/281 |

FOREIGN PATENT DOCUMENTS

| EP | 1631059 A | 3/2006 |
| WO | WO2005079069 A | 8/2008 |

OTHER PUBLICATIONS

Lotspiech, J. et al., "Anonymous Trust: Digital Rights management Using Brodcast Encryption" Proceedings of the IEEE, IEEE NY, US vol. 92, No. 6, Jun. 1, 2004. pp. 898-909.

(Continued)

*Primary Examiner*—Longbit Chai
(74) *Attorney, Agent, or Firm*—Jill Poimboeuf; Jeffrey L. Streets

(57) ABSTRACT

An apparatus and a method are provided for selectively accessing digital content carried on a distribution medium such as a physical medium or a broadcast medium. In one embodiment, a plurality of digital content items are encrypted under a plurality of different key management blocks, wherein each key management block is associated with a different set of device keys. The plurality of content items may be provided together on a single distribution medium to devices having assigned device keys, so that devices may selectively access content as determined by the different key management block used to encrypt the various content items and by the device keys assigned to the devices. Depending on the association between the device key and the key management blocks, the decoding device may decode all of the content items, some of the content items, or none of the content items. To provide greater security, each content item may be multiple encrypted using multiple key management blocks per content item.

20 Claims, 8 Drawing Sheets

OTHER PUBLICATIONS

Lotspiech, Jeffrey B.—Alireza, Seyedi et al., "A Signature-Like Primitive for Broadcast Encryption Based Systems", Consumer Communications and Networking Conference, 2007. Jan. 1, 2007, pp. 1042-1047.

Lotspiech, J.B. et al., "Peer to Peer Content Protection" IEEE Signal Process Magazine. vol. 21, No. 2, Mar. 1, 2004, pp. 71-81.

Fiat, A. et al., "Broadcast Encryption" Advances in Cryptology. Santa Barbara, Aug. 22-26, 1993. pp. 480-491.

PCT/EP2008/051022, International Search Report, Aug. 22, 2008, 3pages.

\* cited by examiner

METHOD FOR CONTROLLING ACCESS TO ENCRYPTED CONTENT USING MULTIPLE BROADCAST ENCRYPTION BASED CONTROL BLOCKS

BACKGROUND OF THE INVENTION

1. Field of the Invention

The present invention relates to the implementation of broadcast encryption schemes. In particular, the present invention relates to encrypting digital content on distribution media, such as physical media and broadcast media.

2. Description of the Related Art

Broadcast encryption is a category of encryption scheme for protecting digital content from unauthorized access, reproduction, and distribution. Broadcast encryption schemes are one-way, which eliminates the requirement for low-level handshakes that tend to weaken the security of copy protection schemes. Also, by eliminating the need for two-way communications, the potentially expensive return channel on a receiver may be eliminated, lowering costs for device manufacturers and users. Though initially developed for use with the actual broadcasting of digital content, such as cable television programming, broadcast encryption schemes have been adapted for use with the encryption and decryption of content on physical media, such as DVDs and flash memory. Examples of conventional broadcast encryption schemes include Content Protection for Recordable Media (CPRM) media, Content Protection for Pre-Recorded Media (CPPM) media, and Advanced Access Content System (AACS) next-generation media.

Two main components of a broadcast encryption scheme are a key management block (KMB) and a device key (Kd) associated with the KMB. A KMB is a matrix or tree of values provided to licensed media manufacturers and broadcasters to control which devices are authorized, by virtue of a Kd included with each device, to decrypt and playback a particular selection of encrypted digital content. Protected recordable DVD discs, for example, each have a KMB stored on them in a protected area. Traditionally, the construct referred to in the singular form as a "device key" is actually a set of keys that may be assigned to a particular device. A device key assigned to a device may be applied to the associated KMB to decrypt content encrypted under the associated KMB. Conventionally, a device will either be authorized, in which case the device may apply its one device key to the one associated KMB to unlock all of the content carried on the medium it is accessing, or else the device will be unauthorized, in which case it cannot unlock any of the content.

Each device key belongs to a particular key space. A key space is a discrete set of keys generally intended for use in a specific content protection application or encryption scheme. The term "device" may be used generically to refer to a device or client application. Accordingly, each device key assigned to a device may be associated with the device itself, as in the case of a device key contained within the firmware of a game console, set top box, or medial player, or a device key may be associated with a client application independent of any device upon which the client application runs, allowing PCs, PDAs, cell phones and game consoles to implement the same encryption/decryption process in a substantively similar manner as described for physical devices. A device or application that has been assigned (or licensed) a device key is referred to as compliant or authorized, and it is assumed that the device will protect the device key and content as described by the entity that owns, governs and controls that particular key space.

Conventionally, a device assigned a device key from the same key space as the KMB used to encrypt content can apply the Kd against the KMB to attempt to derive a management key (Km). An authorized device (a device whose Kd is from the same key space and is also associated with the KMB) will derive the correct Km. An unauthorized device (a device whose Kd may be from the same key space but is not associated with the KMB) will, at best, compute an incorrect Km. Devices that are neither associated with the KMB nor belong to the same key space may not be able to compute a value for Km at all, much less the correct Km. A correctly extracted Km is used to decrypt the encrypted digital content either directly or indirectly. An example of indirect encryption ("indirection") would be to use the Km to first decrypt a title key (Kt), and the decrypted Kt may then be used to decrypt the digital content. Multiple levels of indirections can be used before the final protected content can actually be decrypted.

The KMB may be associated with a virtually unlimited number of selected devices. For example, a single KMB may be associated with a million different device keys, each assigned to a different device, to allow the million different devices to decode the digital content encrypted under the single KMB. The KMB may be updated, as desired, to change the set of devices that are able to access encrypted content. For example, if any element of the encryption process is compromised, such as due to activity by hackers to obtain unauthorized access to secret device keys, an updated KMB may be generated for a particular title encrypted under the KMB to exclude the compromised device keys from decoding the encrypted content. Subsequent production runs of a DVD title may be manufactured with the updated KMB to exclude the now unauthorized devices from decoding the encrypted content.

Existing applications for encryption schemes have limitations, despite ongoing advances in encryption technology In particular, the ability to decrypt content is conventionally an "all or nothing" process using a single KMB. In other words, a device is either able to decode all of the content or none of the protected content residing on a DVD, a broadcast channel, or other distribution medium. An improved encryption system would therefore be desirable, to provide more selective access to encrypted content. It would be desirable if the improved encryption system included aspects of existing broadcast encryption schemes.

SUMMARY OF THE INVENTION

In a first embodiment, a plurality of digital content items are selected. A plurality of key management blocks each associated with a different group of device keys are also selected. Each digital content item is encrypted under a different set of one or more of the key management blocks. The encrypted digital content items are provided together on a distribution medium to devices having one or more assigned device keys for selectively decrypting the encrypted digital content items.

In a second embodiment, content items that are each encrypted under a plurality of key management blocks are selected. The key management blocks associated with each content item are retrieved. A search is performed for device keys from the same key space as the retrieved key management blocks. A subset of content items is identified wherein a device key is found for each key management block. The device keys are applied to the subset of content items to attempt to decrypt the subset of content items.

In a third embodiment, a computer program product is provided, comprising a computer usable medium including computer usable program code for selectively decoding encrypted data. The computer program product includes computer usable program code for selecting content items each encrypted under a plurality of key management blocks; for retrieving the key management blocks associated with each content item; for applying device keys from the same key space as the retrieved key management blocks; for identifying a subset of content items for which a device key is found for each key management block; and for applying the device keys to the subset of content items to attempt to decrypt the subset of content items.

Other embodiments, aspects, and advantages of the invention will be apparent from the following description and the appended drawings and claims.

DETAILED DESCRIPTION OF PREFERRED EMBODIMENTS

Figure 1A:
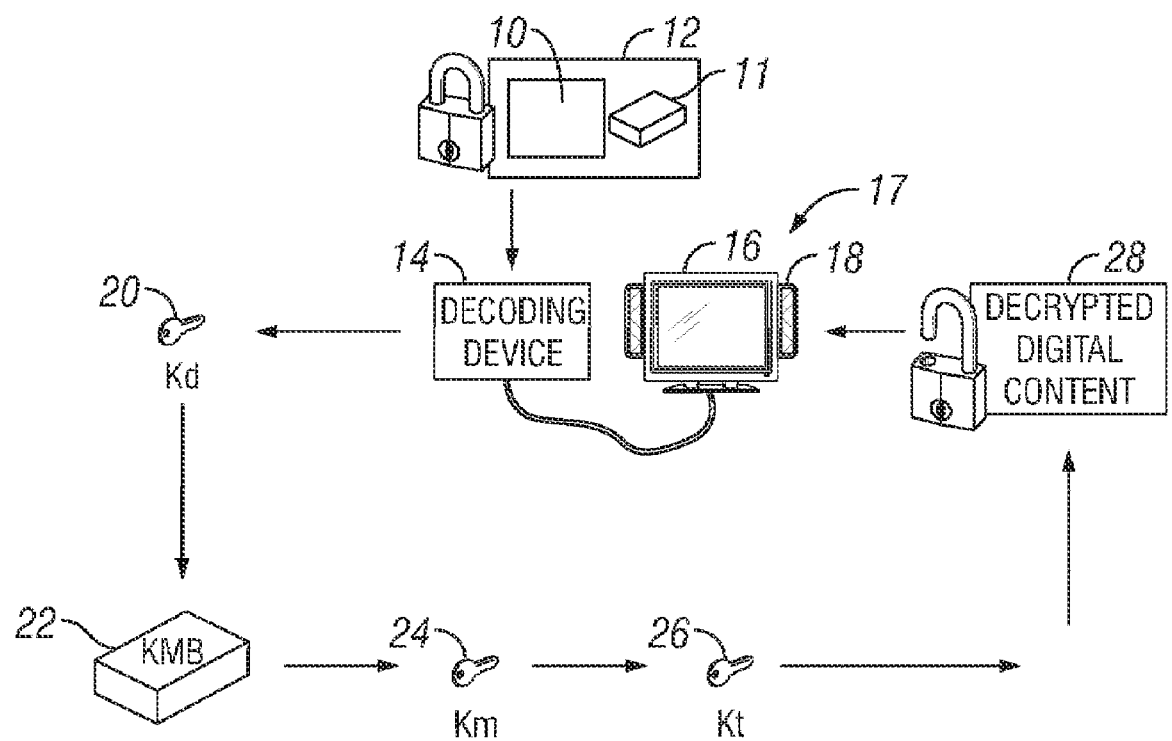
FIG. 1A is a process diagram illustrating a process of decrypting ("decoding") encrypted digital content using a conventional broadcast encryption/decryption scheme.

The present invention provides systems and methods for more selectively accessing digitally encrypted content by virtue of multiple content items encrypted under multiple KMBs and carried on a single distribution medium. Examples of suitable distribution media include broadcast media, such as streaming multimedia applications and cable television broadcasts, as well as physical media, such as optical storage discs and flash memory modules. Suitable nonlimiting examples of physical media include DVD, DVD-R, DVD-RW, HD-DVD, CD, CD-R, CD-RW and Blu-ray Disc.

The invention simultaneously increases the power and versatility of both conventional and future-developed encryption algorithms, while broadening the realm of distribution media suitable for use with encryption schemes. In one embodiment, for example, the invention uniquely provides selective access to programming content encrypted and broadcast on a broadcast medium to a subscriber's home, where it may be selectively decoded by a set-top box or other decoding device. In another embodiment, the invention uniquely provides selective access to multimedia content encrypted and stored on a physical medium, such as a DVD or flash memory device, and selectively decoded by a PC or other electronic device.

A plurality of key management blocks may coexist under the invention, wherein management keys protected within one or more key management blocks are used to encrypt a piece of content. The protected content is encrypted using management keys from one or more KMBs that were each constructed using one or more device key sets that may or may not be available to a single consuming device. These device keys, residing on the consuming device, can thus be used to decode content which has been encrypted with management keys from one or more KMB. Multiple digital content items may be encrypted using multiple KMBs and provided on a single distribution medium. The digital content items may be, for example, channels of cable television programming content to be broadcast, or files to be stored on an optical storage disc that may have a DVD-like form factor. Each content item on the single distribution medium may be encrypted using a different KMB, so that each content item may be accessed by a different set of compliant devices.

A mapping may be provided between the plurality of encrypted content items within that distribution medium, to the corresponding plurality of KMBs that must be used to derive the correct Km for each piece of content. The mapping may also indicate a required order of processing the KMBs in order to correctly decrypt the content. In some embodiments, the mapping is included on the distribution medium, whereas in other embodiments the mapping can be provided separately.

Each content item may also be "multiply-encrypted," wherein multiple KMBs are used to encrypt each content item. Such a system effectively permits protection of a piece of content in such a way that different layers of access control can be achieved by using multiple KMBs. To be compliant with respect to a multiply-encrypted content item, a device would need a device key associated with each KMB under which the content item was encrypted. Compliance could be established by using as few as one device key associated with each of the multiple KMBs. For greater security, compliance could be established by assigning a device multiple device keys, with a different device key uniquely associated with each KMB. This more stringent compliance requirement enhances security of digital encryption.

Furthermore, each KMB could be generated under a different key space. Multiple entities, each using their respective key spaces, can protect a plurality of content either separately or in conjunction with each other on a given distribution medium. This enables selective access to that content across the union of compliant devices or client applications, each of which possess one or more device keys assigned from one or more of the participating key spaces. Each key space could be a proprietary key space and/or established using a different encryption algorithm. The use of multiple key spaces provides greater selectivity with regard to authorized access to the encrypted content. For example, even if hackers were to successfully reverse-engineer one encryption algorithm associated with one of the key spaces, a content item would remain inaccessible to unauthorized users under encryption algorithms associated with the other key spaces.

In one application, multiple programming packages may each be encrypted under a different KMB or set of KMBs and broadcast simultaneously in a single data stream to a subscriber's television cable set top box. Thereby, a cable television provider may use the invention to control which programming packages each subscriber may access. In the case of a broadcast medium, a suitable decoding device may be a set top box or cable-ready television. In the case of a physical medium, such as a DVD, a suitable decoding device may be a PC or DVD player. Again, the device key may be tied to the device itself or instead to a client application running on the device. In another application, multiple files or folders may each be encrypted under a different KMB and combined onto a single DVD or other physical media. For example, a company may combine many different files on a single DVD, and control which files each employee may access from the DVD.

FIG. 1A is a process diagram illustrating the decrypting (i.e. "decoding" or "unlocking") of encrypted digital content using a conventional broadcast encryption/decryption scheme. Digital Content 10 is encrypted under a single KMB 11 and stored on a distribution medium 12. The distribution medium 12 may be, for example, a physical distribution medium such as a DVD, a flash memory module, or a cable television data stream provided to a subscriber. A decoding device 14 electronically receives and selectively decrypts the digital Content 10. An output device 17 is provided for playing back the decrypted content. The output device 17 may include a display 16 for displaying decrypted images and audio speakers 18 for playing decrypted audio content. The decoding device 14 includes a unique device key (Kd) 20, which the decoding device 14 uses to process a KMB 22 under which the digital Content 10 was encrypted. Using its unique device key 20, the decoding device 14 processes the KMB 22 in an attempt to compute a management key (Km) 24. The decoding device 14 may be authorized by virtue of an association between the device key 20 and the KMB 22, so that the decoding device 14 will compute the correct management key 24. Assuming the decoding device 14 is authorized, and has the proper device key so that the correct management key 24 is therefore computed, the decoding device 14 will then use the management key 24 to correctly compute a title key (Kt) 26 under which the digital Content 10 was encrypted. The decoding device 14 then uses the title key 26 to decrypt the digital Content 10 to obtain decrypted digital Content 28. The decoding device 14 may then play back the decrypted digital Content 28 on the output device 17.

Figure 1B:
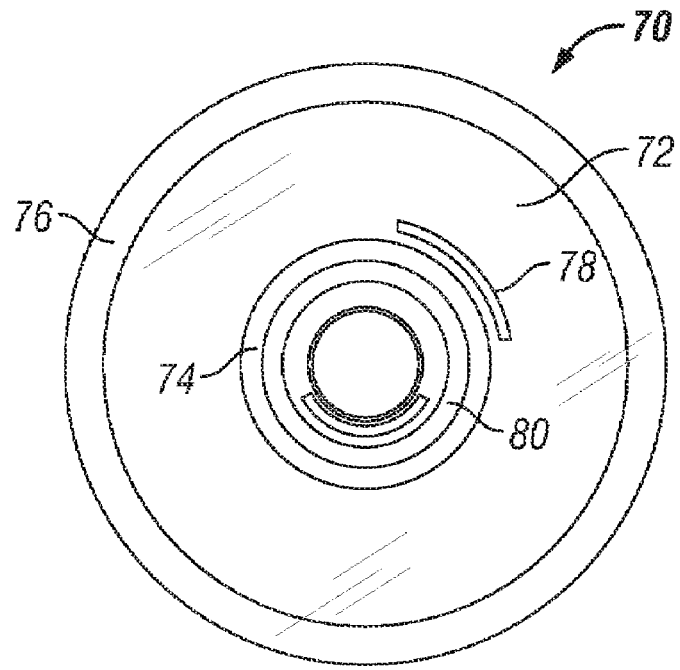
FIG. 1B is a schematic diagram of a conventional DVD that uses a version of the broadcast encryption process generally outlined in FIG. 1A.

The conventional encryption process outlined in FIG. 1A may be applied to a variety of distribution media, including physical media such as DVDs and broadcast media such as cable television broadcasts. For example, FIG. 1B is a schematic diagram of a conventional DVD 70 that uses a version of the broadcast encryption process generally outlined in FIG. 1A. The conventional DVD 70 includes an encrypted content portion 72 that may be used to store encrypted content. For example, content such as movie files, high quality music files, or document files may be digitally stored in an encrypted format on the encrypted content portion 72. A pre-embossed lead-in 74 guides an optical reader, such as one or more lasers included with a playback device, to the various portions of the DVD 70. An unrecorded area 76 is left at the edge of the DVD 70, where the DVD 70 is likely to be handled and is more prone to damage. A single key management block (KMB) is stored on a KMB portion 80. The content stored on the encrypted data portion 72 has been encrypted in association with the single KMB stored on the KMB portion 80. An authorized device, which in the conventional encryption process is a device having a device key (which, again, may actually be a set of keys that together comprise the device key) associated with the single KMB, may decrypt all of the encrypted content stored on the encrypted data portion 72. An unauthorized device will not be able to decrypt any of the encrypted content.

Figure 2:
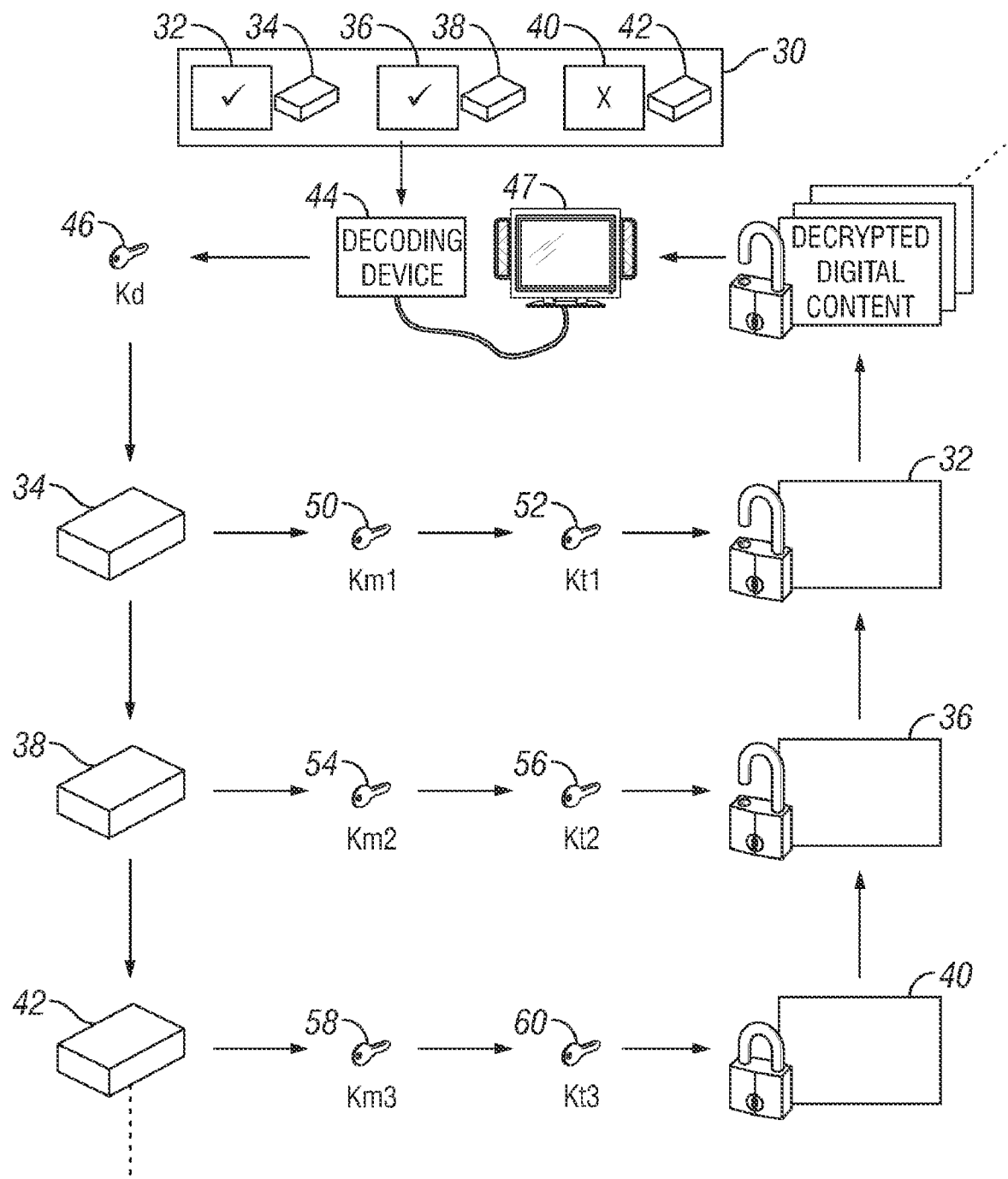
FIG. 2 is a diagram illustrating an embodiment wherein a single device key is used to selectively accessing digital content encrypted on a single distribution medium under a plurality of KMBs according to the invention.

FIG. 2 is a diagram illustrating an embodiment wherein a single device key is used to selectively access digital content encrypted on a single distribution medium 30 under a plurality of KMBs according to the invention. The distribution medium 30 may be, for example, a physical distribution medium such as a DVD, an electronic memory storage device such as a flash memory module, or broadcast media such as a cable television data stream provided to a subscriber. A first digital content item 32 is encrypted under a first KMB 34, a second digital content item 36 is encrypted under a second the KMB 38, and a third digital content item 40 is encrypted under a third KMB 42. A decoding device 44 and output device 47 are included for selectively decrypting and playing back the digital content stored on the distribution medium 30. The device 44 includes a unique device key (Kd) 46. The device key 46 may be associated with all, some, or none of the KMBs 34, 38, 42, as desired by the person or entity authorizing access to the content, such as the broadcaster or distributor. For purpose of illustration it will be assumed that the device key 46 is associated with the first KMB 34 and the second KMB 38, but not the third KMB 42. The decoding device 44 is in communication with the distribution medium 30, to receive and attempt to decrypt the associated digital content.

The decoding device 44 first attempts to decrypt content item 32. The device key 46 is applied to the first KMB 34 to extract a first media key 50 ("Km1"). Because the device key 46 is associated with the KMB 34, the decoding device 44 will correctly extract the first management key 50. The first management key 50 is then used to decrypt a first title key 52 under which the content item 32 was encrypted. The decrypted first title key 52 is then used to decrypt the content item 32. The decoding device 44 then attempts to decrypt the second content item 36. The device key 46 is applied to the second KMB 38 to extract a second management key ("Km2") 54. Because the device key 46 is also associated with the KMB 38, the decoding device 44 will correctly extract the second management key 54. The second management key 54 is then used to decrypt a second title key 56 under which the second content item 36 was encrypted. The decrypted second title key 56 is then used to successfully decrypt the second content item 36. The decoding device 44 then attempts to decrypt content item 40. The device key 46 is applied to the third KMB 42 in an attempt to extract a third media key 58. However, because the device key 46 is not associated with the third KMB 42, the decoding device 44 will not be able to extract the correct third media key 58. The "incorrect" management key 58 will not successfully decrypt a third title key 60. Therefore, the decoding device 44 will be unable to decrypt the third content item 40. To summarize, the decoding device 44 is able to successfully decrypt content items 32 and 36, but not content item 40. The decrypted first and second content items 32 and 36 may be selectively played back on the output device 47.

Figure 3:
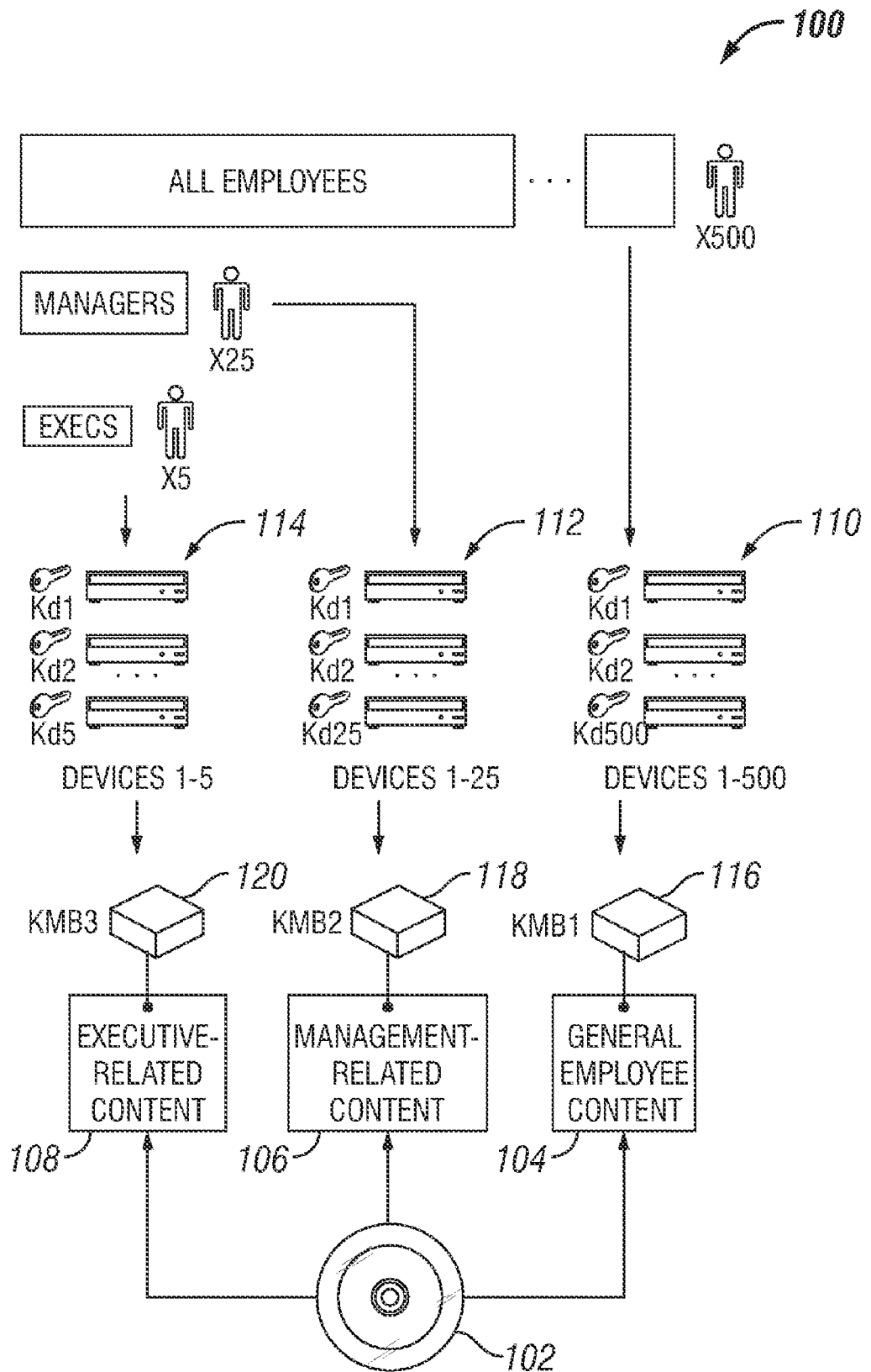
FIG. 3 is a process diagram illustrating an embodiment wherein multiple KMBs are used to provide different levels of access to content to different groups of devices/users according to the invention.

FIG. 3 is a process diagram illustrating an embodiment wherein multiple KMBs are used to provide different levels of access to content to different groups of devices/users according to the invention. Digital content is recorded on a physical medium 102, which in this case is a DVD (or other optical disc) 102. The process of FIG. 3 contemplates a hypothetical company having five-hundred total employees, including twenty-five managers and five executives. It is desired to control each employee's access to content according to job title. A first set of content is referred to as "general employee content" 104. A second set of content is referred to as management related Content 106. A third set of content is referred to as an executive related Content 108. Each employee is assigned a device suitable for reading the DVD 102, such as a DVD player or a PC with a DVD drive. Each device has its own unique device key, which is one of five hundred device keys. For simplicity, it is assumed that every employee has exactly one device, each with its own unique device key. Thus, there are a total of five-hundred devices and five-hundred corresponding device keys, with one device and device key for each employee. A first set of devices 110 includes all five-hundred devices in the company. A second set of devices 112 includes twenty-five devices belonging to the twenty-five managers in a one to one correspondence. A third set of devices 114 includes five devices belonging to the five executives in a one-to-one correspondence. It should be noted that, though not required, the second set of (twenty-five) devices 112 and the third set of (five) devices 114 are each subsets of the first set of (all five-hundred) devices 110. This is because, in this example, every manager and every executive is included in the five-hundred employees in the hypothetical company.

Unlike the conventional DVD 70 of FIG. 1B, the DVD 102 of FIG. 3 includes digital content recorded under three different KMBs 116, 118, 120, all of which reside on the DVD 102. The general employee Content 104 is encrypted under the KMB1 116, which is associated with all five-hundred device keys included with the first devices 110. For simplicity, this example assumes each device contains only one device key, although a device may optionally contain multiple device keys according to the invention, as discussed further below. The management related content is encrypted under the KMB2 118, which is associated with the twenty-five device keys included with the second set of devices 112. The executive related Content 108 is encrypted under the KMB3 120, which is associated with the five device keys included with the third set of devices 114. Thus, all five-hundred employees are able to access the general employee Content 104 using their respective devices, while only the twenty-five managers are able to access the management related Content 106, and only the five executives are able to access the executive related Content 108. Thus, the invention allows the company to provide selective access to digital content stored on the DVD 102 by selecting a plurality of digital Content 104, 106, and 108, generating a plurality of KMBs 116, 118, 120, encrypting each content item using a selected one of the KMBs 116, 118, 120, and combining and recording each encrypted content item and each KMB on the DVD 102. The KMBs may be periodically updated to reflect changes in the company, such as employees being promoted, changing positions, joining, or leaving the company.

Figure 4A:
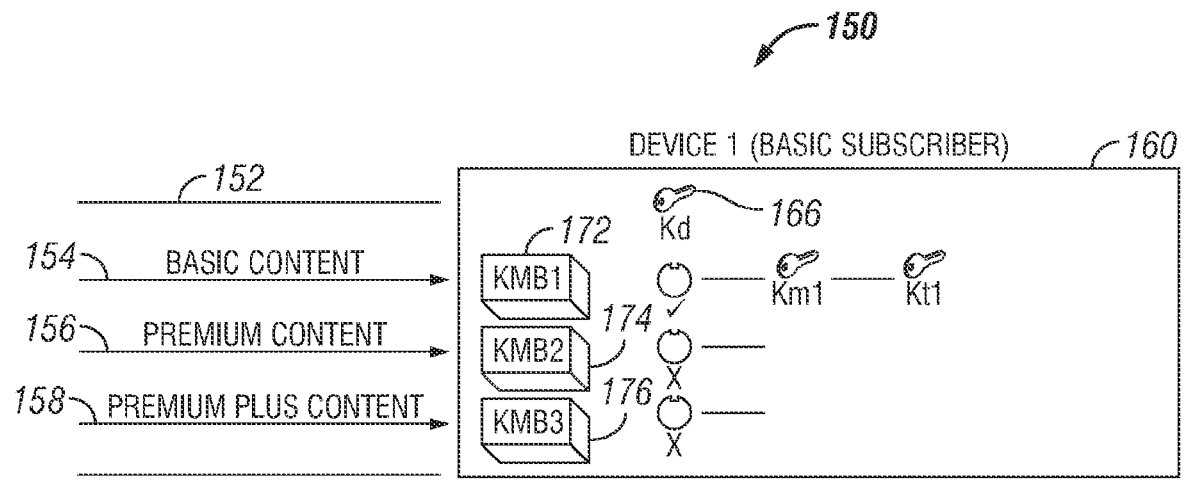
FIG. 4 is a process diagram illustrating an embodiment wherein selective access is provided to digital content broadcast in a single broadcast data stream.
Figure 4B:
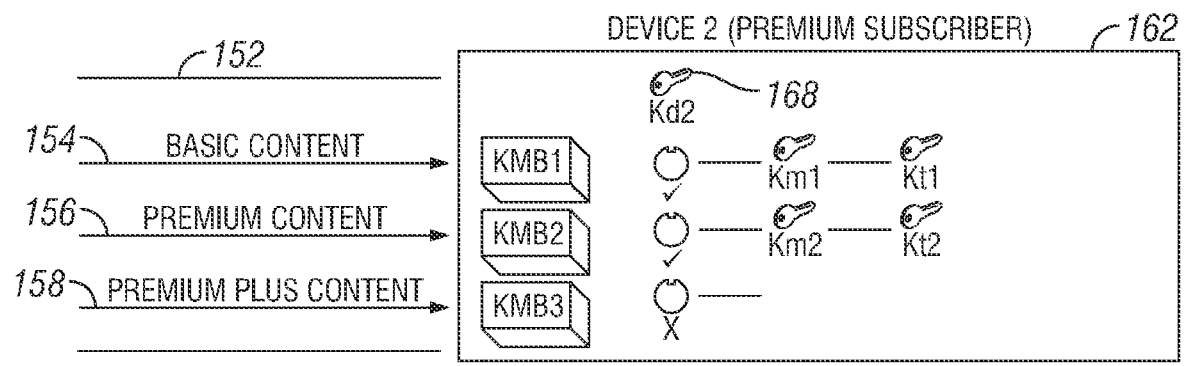
Figure 4C:
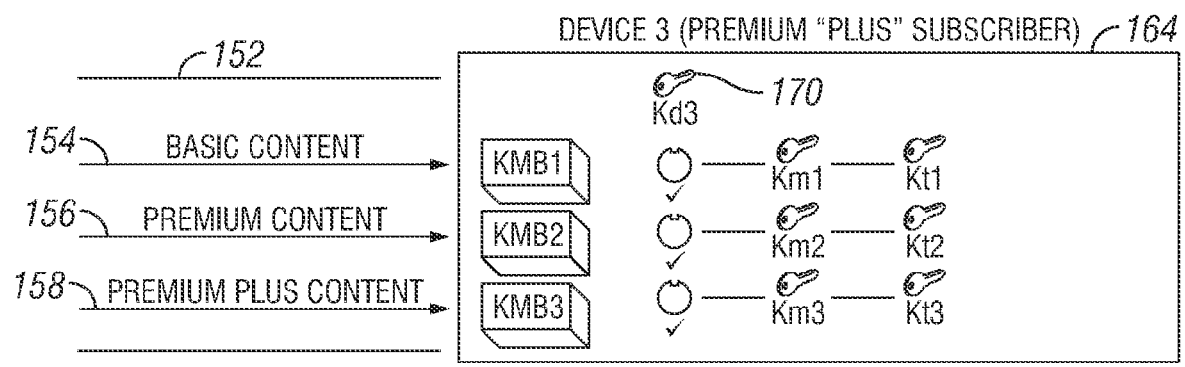

FIG. 4 is a process diagram illustrating an embodiment wherein selective access is provided to digital content broadcast in a single broadcast data stream 152. The broadcast data stream 152 may be provided by a cable television provider to its subscribers. The broadcast data stream 152 includes, by way of example and not by limitation, content associated with three different programming packages: basic programming 154, "premium" programming 156, and "premium plus" programming 158. Basic programming 154 may be provided to all subscribers whose accounts are in good standing, while premium programming 156 and premium plus programming 158 may be provided for those subscribers who have paid extra fees associated with those programming packages. For sake of efficiency, and to avoid the problem of broadcasting different content to different subscribers, all content may be combined and broadcast together in an encrypted format to all subscribers, in a manner that allows each subscriber to selectively decrypt the content according to his or her subscription.

A cable television provider will typically provide service to thousands of cable television subscribers. For simplicity, however, only three subscribers are illustrated in FIG. 4, each representing one of three subscription levels. Three decoding devices are included in this example: a first decoding device 160 assigned to a subscriber of basic programming 154, a second decoding device 162 assigned to a subscriber of "premium" programming 156, and a third decoding device 164 assigned to a subscriber of "premium plus" programming 158. Typically, the decoding devices 160, 162, and 164 are cable set top boxes (STBs) that are each assigned a unique device key. Each decoding device 160, 162, and 164 receives the same broadcast data stream 152 in which all the programming content is carried. A first device key 166 is assigned to the first decoding device 160, a second device key 168 is assigned to the second decoding device 162, and a third device key 170 is assigned to the third decoding device 164. As in FIG. 3, the example of FIG. 4 is simplified to assume that each device is only assigned one device key.

Basic programming 154 is encrypted under a first KMB 172 that is associated with all three device keys 166, 168, and 170. Thus, all subscribers may view at least basic programming 154. Premium programming 156 is encrypted under a second KMB 174 that is associated with a second management key 168. Thus, a premium subscriber will be able to view both the basic programming Content 154 and the premium programming Content 156. Premium plus programming 158 is encrypted under a third KMB 176 that is associated with a third management key 170. Thus, a premium plus subscriber will be able to view the basic programming Content 154, the premium programming Content 156, and the premium plus programming 158.

As the first decoding device 160 receives the broadcast data stream 152, it may attempt to decrypt all of the programming content carried in the data stream 152. The first decoding device 160 will first apply its device key ($Kd_1$) 166 to the first KMB 172. Because the first device key 166 is associated with the first KMB 172, the first device 160 will be able to correctly extract a first management key ($km_1$) and decrypt a first title key ($kt_1$) to decrypt the basic programming Content 154. However, as the first decoding device 160 applies its first device key 166 to either the second KMB 174 or the third KMB 176, the first decoding device 160 will be unable to decrypt either premium programming 156 or premium plus programming 158. Thus, the basic subscriber is only able to view the basic programming Content 154.

As the second decoding device 162 receives the broadcast data stream 152, it also attempts to decrypt all of the programming content carried in the data stream 152. The second decoding device 162 will first apply its device key 168 to the first KMB 172. Because the second device key 168 is associated with the first KMB 172, the second decoding device 162 will be able to correctly extract the first management key $km_1$ and decrypt the title key $Kt_1$ to decrypt the basic programming Content 154. Likewise, because the second device key 168 is also associated with the second KMB 174, the second decoding device 162 will also be able to correctly extract a second management key $Km_2$ and decrypt a second title key $Kt_2$ to decrypt the premium programming 156. However, as the second decoding device 162 applies its second device key 168 to the third KMB 176, the second decoding device 162 will be unable to decrypt the premium plus programming 158. Thus, the premium subscriber is able to view both the basic programming Content 152 and the premium programming Content 156, but not the premium plus programming Content 158.

As the third decoding device 164 receives the broadcast data stream 152, it also attempts to decrypt all of the programming content carried in the data stream 152. The third decoding device 164 will first apply its device key 172 to the first KMB 172. Because the third device key 170 is associated with the first KMB 172, the third decoding device 164 will be able to correctly extract the first management key $Km_1$ and decrypt the first title key $Kt_2$ to decrypt the basic programming Content 154. Likewise, because the third device key 170 is also associated with the second KMB 174, the third decoding device 164 will also be able to correctly extract the second management key $Km_2$ and decrypt the second title key $Kt_2$ to decrypt the premium programming 156. Finally, as the third decoding device 164 applies its device key 172 to the third KMB 176, the third decoding device 164 will also be able to decrypt to the premium plus programming 158. Thus, the premium plus subscriber is able to view the basic programming Content 152, the premium programming Content 156, and the premium plus programming Content 158.

The location of content contained within a distribution medium may be indexed with the KMBs used to decrypt content. In the context of physical media, many encrypted content items in the form of files may be stored and indexed on a single DVD. It is not necessary that every content item contained on a distribution medium is encrypted under a different KMB. For example, on a DVD five KMBs may be used to encrypt a total of one hundred files, with each file being encrypted under a selected one of the five KMBs. An individual content item may also be fragmented and stored in different locations on a distribution medium. For example, in the context of physical media, content encrypted under a particular KMB may be scattered Among many sectors of a DVD. The sectors may be indexed or mapped to the KMBs so that each file or file fragment is decrypted using the correct KMB. Likewise, in the context of broadcast media, encrypted programming content may be scattered Among randomly ordered packets carried in a data stream, and an index may be provided in the data stream to map each packet to the correct KMB.

Whereas FIGS. 2-4 illustrated examples of controlling access to content using multiple KMBs but only one device key per device, FIGS. 5-8 expand on the invention by describing the use of multiple KMBs and multiple device keys belonging to multiple key spaces.

Figure 5:
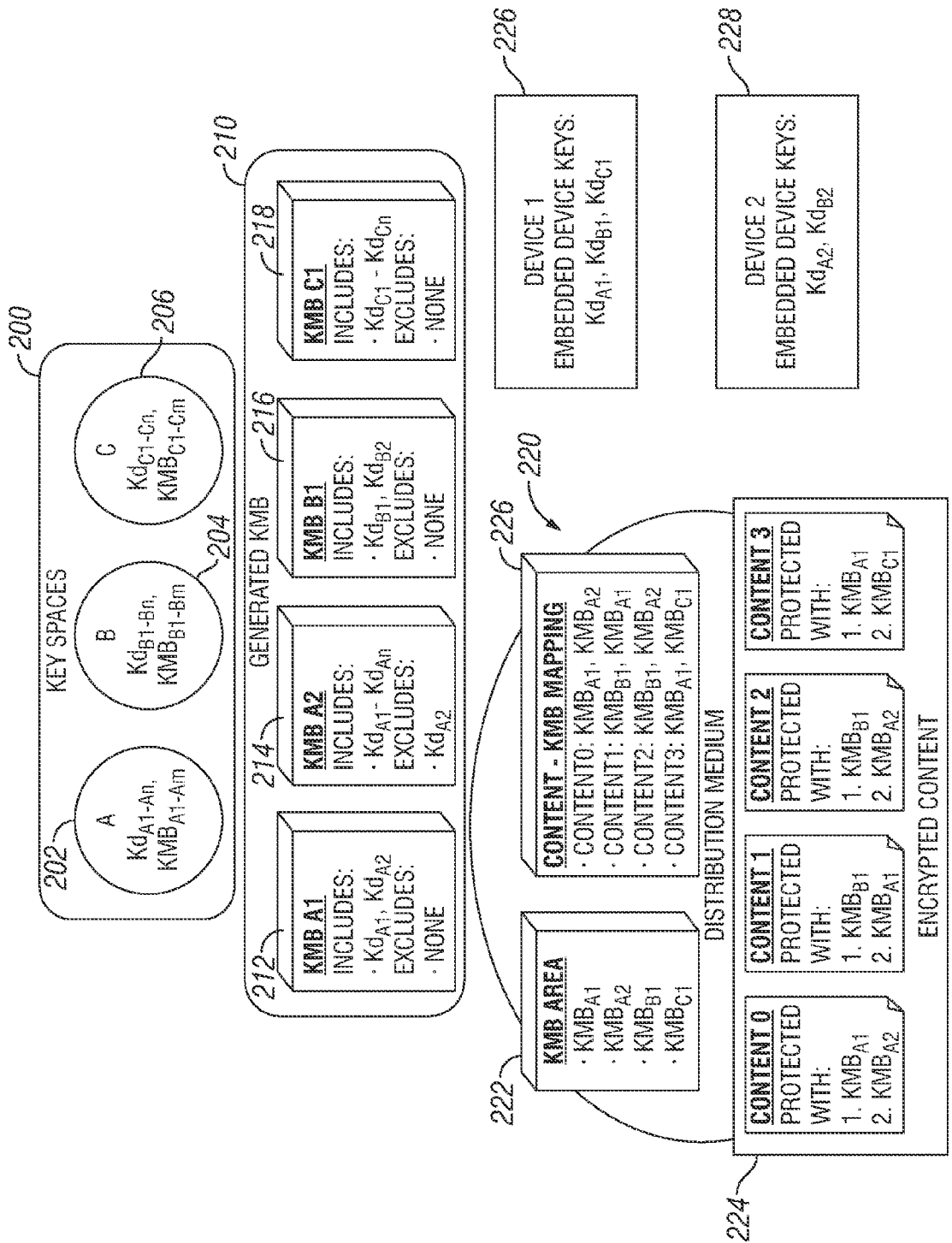
FIG. 5 is a diagram illustrating an example of a relationship between multiple key spaces, multiple device keys and KMBs belonging to the key spaces, and how the relationship between these elements control access by different devices to various content items carried on a physical medium.

FIG. 5 is a diagram illustrating an example of a relationship between multiple key spaces, multiple device keys and KMBs belonging to the key spaces, and how the relationship between these elements control access by different devices to various content items carried on a physical medium. A set of hypothetical key spaces is indicated at 200. A first key space 202 ("A") includes n device keys $Kd_{A1-An}$ and m key management blocks $KMB_{A1-Am}$. A second key space 204 ("B") and a third key space 206 ("C") similarly include their own respective key spaces and key management blocks. The key spaces are non-intersecting, indicating that the key spaces 202, 204, 206 each comprise their own, discrete set of keys and KMBs. Each key space may optionally be associated with a different encryption algorithm, or are otherwise proprietary and unique from one another.

A set of KMBs indicated at 210 are selected by way of example from the set of key spaces 200. Generally, any number of device keys may be associated with a KMB, and the KMBs 210 are associated with different numbers of device keys. A first KMB 212 ("A1") belongs to key space A and is associated with a set of two device keys, $Kd_{A1}$ and $Kd_{A2}$. A second KMB 214 ("A2") also belongs to key space A and includes a set of device keys $Kd_{A1}$ through $Kd_{An}$, from which a device key $Kd_{A2}$ is excluded. The entity who controls KMB A2 may have excluded device key $Kd_{A2}$ from A2 for any desired reason, such as to protect against a breach of security with a respect to a device having that key, or to exclude a non-paying subscriber from receiving programming content optionally encrypted under A2. A third KMB 216 ("B1") belongs to key space B and includes $Kd_{B1}$ and $Kd_{B2}$. A fourth KMB 218 ("C1") belongs to key space C and includes a set of device keys $Kd_{C1}$-$Kd_{Cn}$ without exclusion. It should be noted that different KMBs from the same key space typically have different Km. Thus, the same Kd used to obtain a Km from a first KMB may be used to obtain a different Km from a second KMB. The KMBs are optionally cacheable in the device, at the discretion of the owning entity.

A distribution medium 220 includes a KMB Area 222 on which the four KMBs A1, A2, B1, and C1 are carried. The distribution medium 220 may be any physical medium, broadcast medium, or other type of medium. A set of content items 224 ("Content 0"-"Content 3") is carried on the distribution medium. For example, the distribution medium 220 may be an optical storage disk, and the content items 224 may be a plurality of multimedia files or other electronic files. In another example, the distribution medium 220 may be a broadcast datastream from a cable television provider, and the content items 224 may represent a plurality of different programming packages. A content map 226 is also carried on the distribution medium 220, mapping the content items 224 to the KMBs 222. A device may use the content map 226 to select the correct KMB(s) for each content item. Each content item 224 is encrypted under two KMBs, as indicated. For example, Content 0 is protected with $KMB_{A1}$ and $KMB_{A2}$, which are each from the same key space, Content 3 is protected with $KMB_{A1}$ and $KMB_{C1}$, which are each from different key spaces. A content map may optionally identify a key space, such that a device having multiple device keys knows which device key to use to at least attempt to derive a correct Km.

Any number of devices may be assigned any number of the device keys included with the key spaces 200. Two devices 226, 228 are illustrated in the figure. The device 226 ("Device 1") includes three device keys $Kd_{A1}$, $Kd_{B1}$, and $Kd_{C1}$. The device 228 includes two device keys $Kd_{A2}$ and $Kd_{B2}$. The key spaces from which these devices are selected are evident from the diagrammed set of key spaces 200, and the KMBs with which these devices are associated are evident from the diagram to set of KMBs 210. FIG. 5 should be used as a reference, as needed, in the discussion of FIGS. 6 and 7 that follow.

Figure 6:
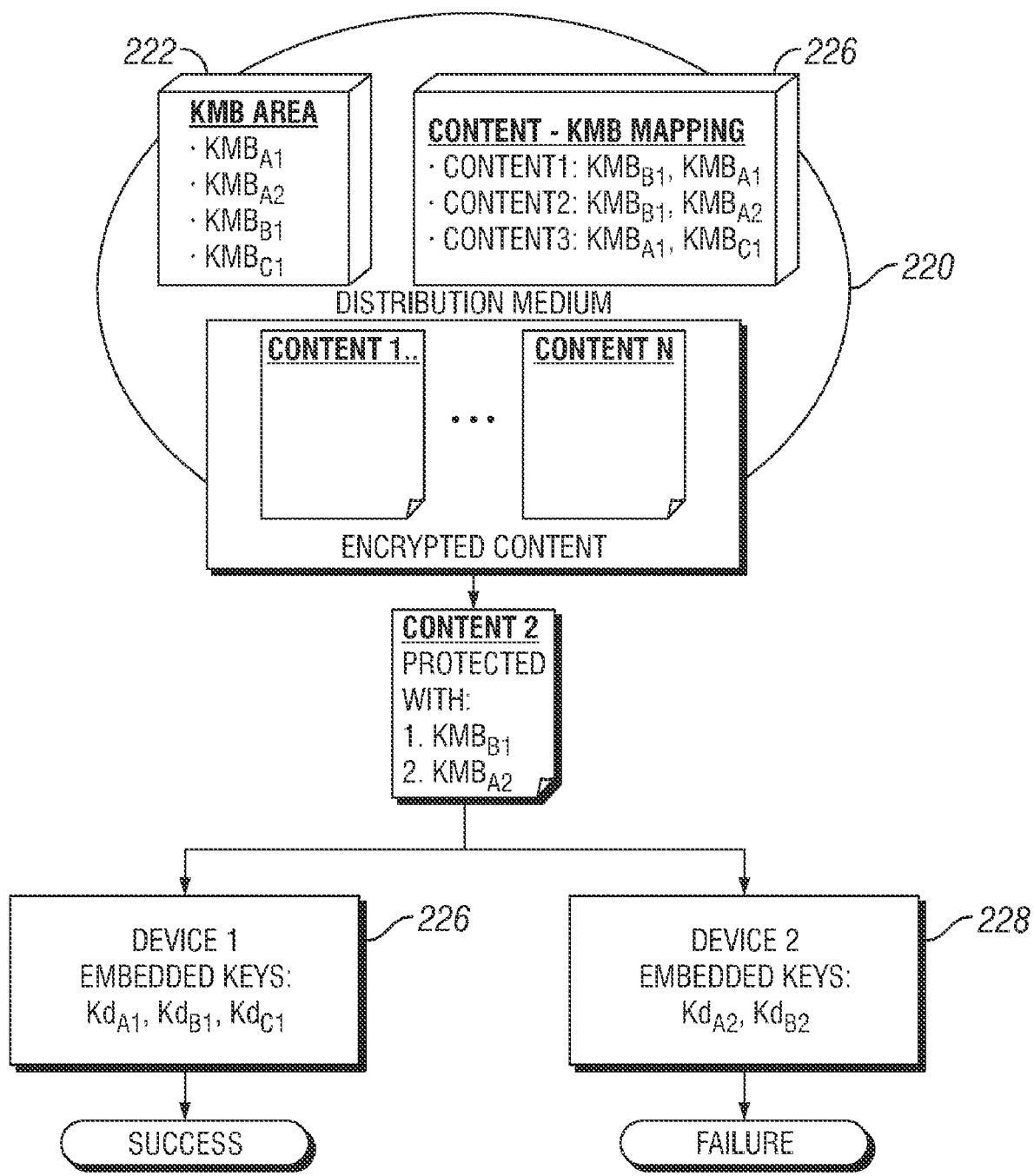
FIG. 6 is a diagram illustrating an example of an application of the encryption system outlined in FIG. 5 to a particular content item.

FIG. 6 is a diagram illustrating an example of an application of the encryption system outlined in FIG. 5 to a particular content item "Content 2." As indicated in the content map 226, and in the notation appended to Content 2, Content 2 is encrypted under $KMB_{B1}$ and $KMB_{A2}$ and a device must have a device key associated with each KMB to decode Content 2. Furthermore, a device must apply the associated device keys in the indicated order. Device 1 successfully decodes Content 2 by applying KdB1 to associated KMBB1 to obtain an intermediate result, and then applying KdA1 to associated KMBA2 to obtain a final result and fully unlock Content 2. Device 2, however, fails to decode Content 2. Device 2 successfully first applies $Kd_{B2}$ to associate $KMB_{B1}$ to obtain an intermediate result. However, because $Kd_{A2}$ is excluded from $KMB_{A2}$, Device 2 is unable to correctly extract the required management key from $KMB_{A2}$. Therefore, Device 2 fails to decode Content 2. The optional requirement that a device have an associated device key for each KMB under which a content item is encrypted provides extra security. An analogy would be an office building requiring one key, ID code, or access code to gain entrance to an exterior door of an office building, and another key, ID code, or access code to gain entrance to an interior suite. Further security is provided by the optional requirement that a device apply the associated keys to a KMB in a predefined order. A related analogy would be that one could not use a key to gain entrance to an interior suite of an office building without first using a key to get past the exterior door. These analogies are provided to facilitate an understanding of how the invention may be applied, but are not intended to limit the scope of the invention.

Figure 7:
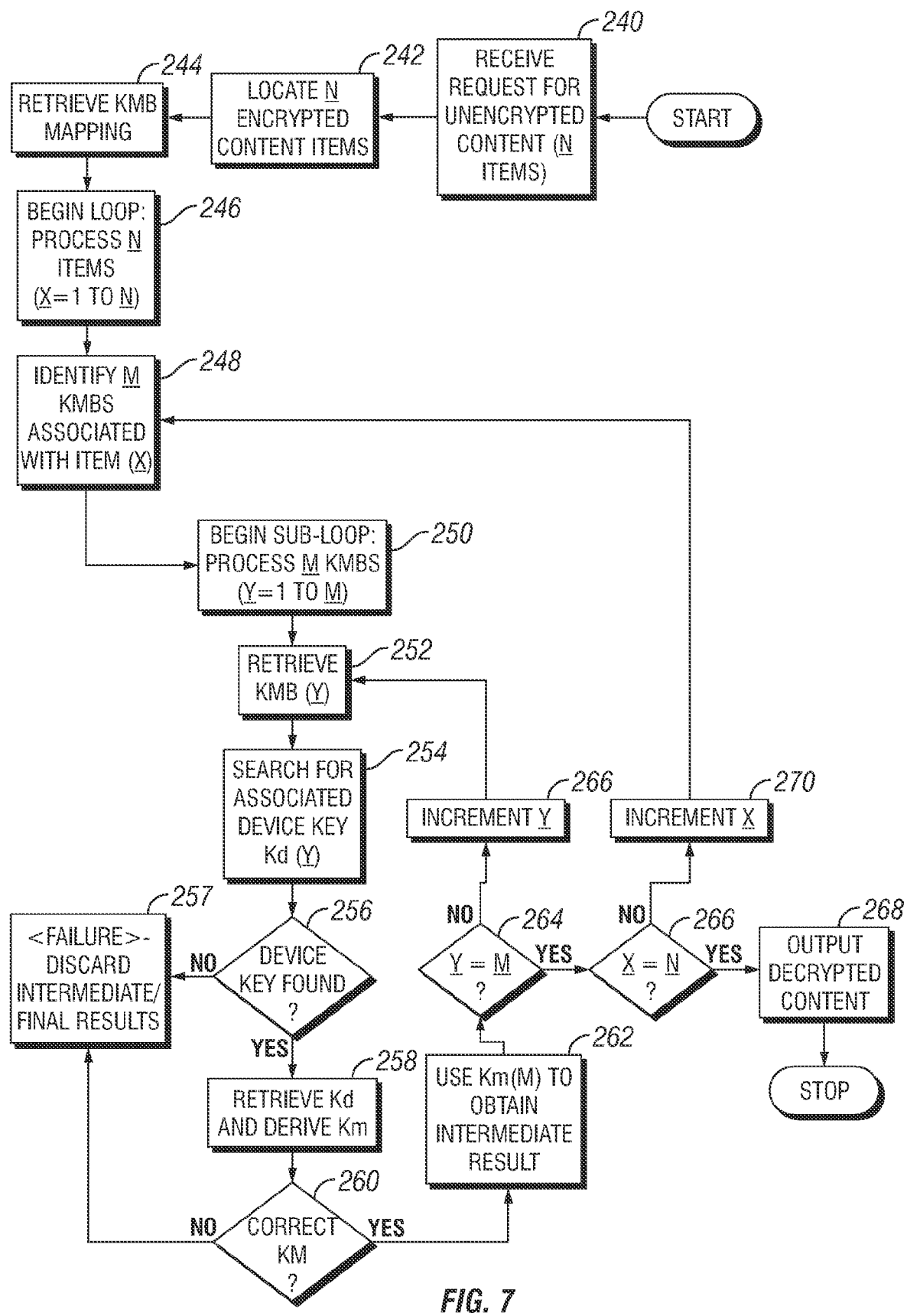
FIG. 7 is a flowchart describing a process of decrypting multiple content items, each encrypted under multiple KMBs according to the invention.

FIG. 7 is a flowchart describing a process of decrypting multiple content items, each encrypted under multiple KMBs according to the invention. The process may begin with a request for unencrypted content in step 240. The request may be made, for example, by a user or by an automated process. For this discussion, it is assumed that the requested content includes a number "N" content items (bolded and underlined for clarity). These content items are located in step 242 in their encrypted condition. The N content items may be processed sequentially, as illustrated in the form of a loop in step 246. The loop is set forth in terms of an independent variable "X" that will vary from 1 to N.

Each content item may be encrypted under any number of KMBs, represented by a nonzero integer "M," as indicated in step 248. The M content items may also be processed sequentially, as illustrated in the form of a sub-loop beginning at step 250. The sub-loop is set forth in terms of an independent variable "Y" that will vary from one to M. The current KMB "KMB(Y)" is retrieved in step 252. In step 254 the device searches for a device key "Kd(Y)" associated with the current KMB. A content map may be provided for selecting a device key from the same key space as the current KMB. In conditional step 256, if no device key is found from the same key space, in the effort to decrypt the current content item is aborted, and any intermediate results from the attempts to decrypt the current item may be discarded in step 257. However, if a device key is located with at least the potential to be associated with the current KMB in step 256, then that device key may be retrieved in step 258, and a media key "Km" may be derived by applying that device key to the current KMB. In step 260, if the derived media key is correct, it may be used to obtain at least an intermediate result in step 262. Conditional step 264 checks whether the sub-loop (decrypting the current content item) has been completed, by comparing Y to M. If Y<M, indicating that the sub-loop is incomplete and that not all of the KMBs have been processed for the current content item, then the next KMB under which the current content item is encrypted by incrementing Y in step 266 and returning to step 252. If, however, all of the KMBs under which the current content item is encrypted have been successfully processed in conditional step 264, then the current content item may be output (not shown). Alternatively, the device or user may delay output of any decrypted content items until all of the requested content items have been examined.

Conditional step 266 determines whether all of the requested content items have been examined by comparing X to N. If X<N, then the next requested content item may be examined by incrementing X in step 270 and returning to step 248. If X=N, indicating that all requested content items have been examined, then the successfully decoded content items may be selectively output in step 268. Output of the decoded content items may be controlled by a user or by the device. For example, in one embodiment, the request for content items may be automated in response to the insertion of a physical medium containing the content items into a computer system. The process of sequentially decrypting the content items may be performed in the background of the computer system, without the participation of the user. When the user eventually requests one of the content items, such as by inputting the request on a peripheral device, the computer system may selectively provide only those content items that were selectively decrypted. Alternatively, the computer system may only indicate the presence of the successfully decrypted content items, and hide the remaining items from view. In another embodiment, the content items may be programming content provided to a television set top box. The set top box may selectively decrypt only the programming content that the user is authorized to view by virtue of the user's subscription, and one or more device keys on the set-top box. These are merely examples of applications encompassed by the process generally outlined in FIG. 7.

It should be noted that application of Km does not necessarily have to be sequential. The intermediate Kms (or results thereof) could also have additional logic steps added to further obfuscate the process (e.g. add some shift to the result between each application). It should also be noted that, just because a device is able to execute the process outlined in FIG. 7 and apply all Km from their device keys. the devices themselves may not "know" whether a Km is valid. For example, an excluded/unauthorized device may still be able to compute a management key, although the management key will be invalid. Therefore, the device may still output a result in step 268 from the process of attempting to decrypt the content, but that output will appear as "junk" to a user. Thus, a more practical measure of successfully decrypting the content will be if the user is provided with correctly decrypted content in a usable form.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium on which the software may reside is generally independent of the physical medium discussed above for storing encrypted content according to some embodiments. The medium can be an electronic, magnetic, optical, electromagnetic, infrared, or semiconductor system (or apparatus or device) or a propagation medium. Examples of a computer-readable medium that may contain software include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 8:
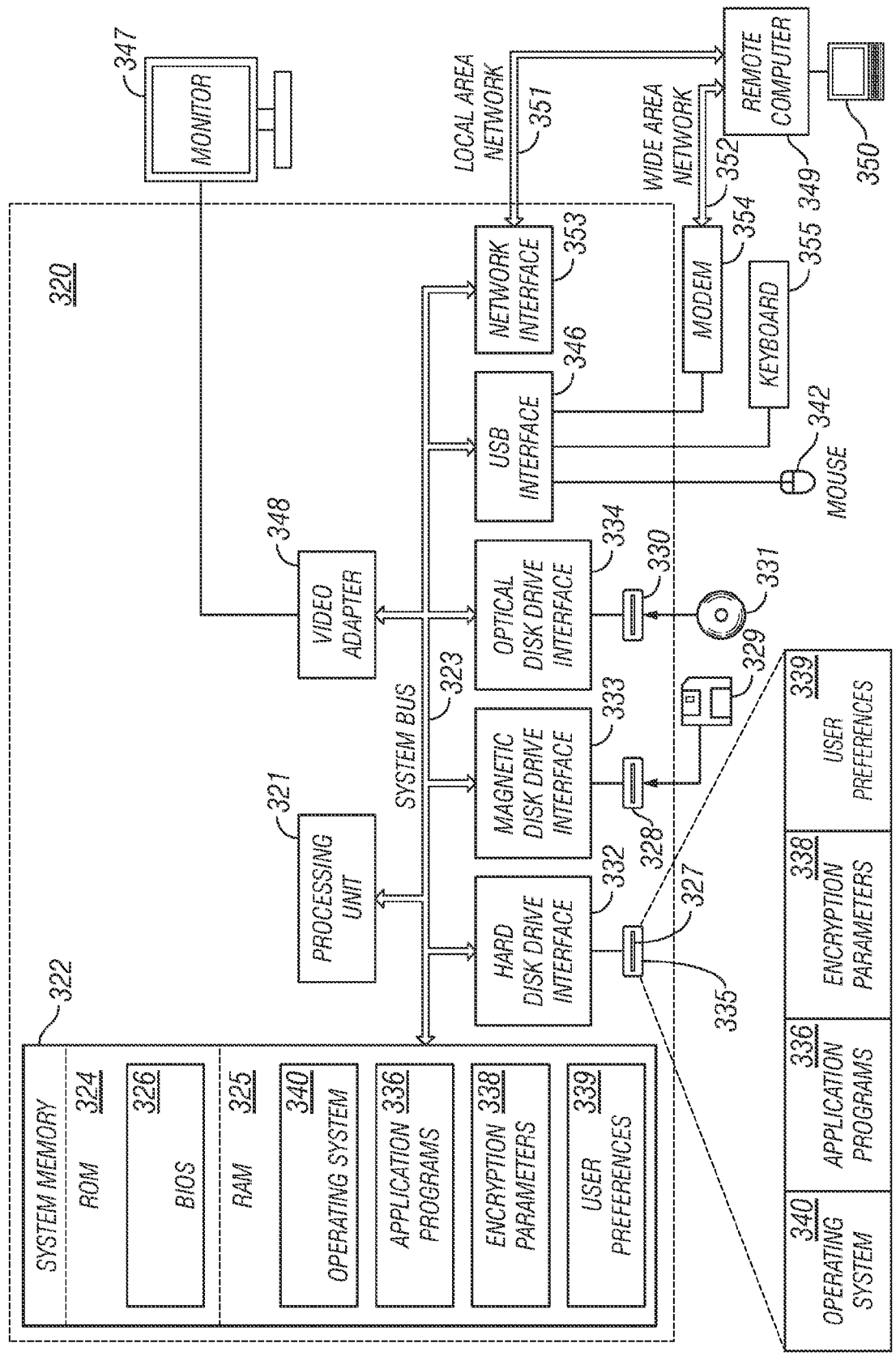
FIG. 8 is a schematic diagram of a computer system that may be configured for digitally encrypting and storing content on a physical medium according to an embodiment of the invention.

FIG. 8 is a schematic diagram of a computer system generally indicated at 320 that may be configured for digitally encrypting and storing content on a physical medium according to an embodiment of the invention. The computer system 320 may be a general-purpose computing device in the form of a conventional computer system 320. Generally, computer system 320 includes a processing unit 321, a system memory 322, and a system bus 323 that couples various system components, including the system memory 322 to processing unit 321. System bus 323 may be any of several types of bus structures including a memory bus or memory controller, a peripheral bus, and a local bus using any of a variety of bus architectures. The system memory includes a read only memory (ROM) 324 and random access memory (RAM) 325. A basic input/output system (BIOS) 326 is stored in ROM 324, containing the basic routines that help to transfer information between elements within computer system 320, such as during start-up.

Computer system 320 further includes a hard disk drive 335 for reading from and writing to a hard disk 327, a magnetic disk drive 328 for reading from or writing to a removable magnetic disk 329, and an optical disk drive 330 for reading from or writing to a removable optical disk 331 such as a CD-R, CD-RW, DV-R, or DV-RW. The optical disk drive 330 may be used, among other things, to read/write encrypted data. Hard disk drive 335, magnetic disk drive 328, and optical disk drive 330 are connected to system bus 323 by a hard disk drive interface 332, a magnetic disk drive interface 333, and an optical disk drive interface 334, respectively. Although the exemplary environment described herein employs hard disk 327, removable magnetic disk 329, and removable optical disk 331, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide non-volatile storage of computer-executable instructions, data structures, program modules, and other data for computer system 320. For example, the operating system 340 and application programs 336 may be stored in the RAM 325 and/or hard disk 327 of the computer system 320.

A user may enter commands and information into computer system 320 through input devices, such as a keyboard 355 and a mouse 342. Other input devices (not shown) may include a microphone, joystick, game pad, touch pad, satellite dish, scanner, or the like. These and other input devices are often connected to processing unit 322 through a USB (universal serial bus) 346 that is coupled to the system bus 323, but may be connected by other interfaces, such as a serial port interface, a parallel port, game port, or the like. A display device 347 may also be connected to system bus 323 via an interface, such as a video adapter 348. In addition to the monitor, personal computers typically include other peripheral output devices (not shown), such as speakers and printers.

The computer system 320 may operate in a networked environment using logical connections to one or more remote computers 349. Remote computer 349 may be another personal computer, a server, a client, a router, a network PC, a peer device, a mainframe, a personal digital assistant, an internet-connected mobile telephone or other common network node. While a remote computer 349 typically includes many or all of the elements described above relative to the computer system 320, only a memory storage device 350 has been illustrated in FIG. 8. The logical connections depicted in FIG. 8 include a local area network (LAN) 351 and a wide area network (WAN) 352. Such networking environments are commonplace in offices, enterprise-wide computer networks, intranets, and the internet.

When used in a LAN networking environment, the computer system 320 is often connected to the local area network 351 through a network interface or adapter 353. When used in a WAN networking environment, the computer system 320 typically includes a modem 354 or other means for establishing high-speed communications over WAN 352, such as the internet. Modem 354, which may be internal or external, is connected to system bus 323 via USB interface 346. In a networked environment, program modules depicted relative to computer system 320, or portions thereof, may be stored in the remote memory storage device 350. It will be appreciated that the network connections shown are exemplary and other means of establishing a communications link between the computers may be used.

Program modules may be stored on hard disk 327, optical disk 331, ROM 324, RAM 325, or even magnetic disk 329. The program modules may include portions of an operating system 340, application programs 336, or the like. An encryption parameter database 338 may be included, optionally containing elements such as one or more device keys and a cache of KMBs. A user database 339 may also be included, containing information about a user along with the user's preferences.

Aspects of the present invention may be implemented in the form of application program 336. Application program 336 may be informed by or otherwise associated with the encryption parameter database 338 and/or user database 339. The application program 336 generally comprises computer-executable instructions for digitally encrypting and storing content on a physical medium, as well as for decrypting that content.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
configuring at least one processor device to perform the functions of:
selecting a plurality of digital content items provided on a single distribution medium;
selecting a plurality of key management blocks each associated with a different group of user device keys;
encrypting each selected digital content item under a different set of one or more of the key management blocks from said plurality of key management blocks; and
providing the encrypted digital content items together on said distribution medium to user devices having one or more assigned user device keys to be used for selectively decrypting said encrypted digital content items to provide the user devices access to the digital content items provided on said distribution medium.

2. The method of claim 1, further comprising selecting at least some of the key management blocks and their associated device keys from different key spaces.

3. The method of claim 1, further comprising mapping the selected content items to their respective sets of key management blocks.

4. The method of claim 3, wherein the mapping includes an order of processing the key management blocks for content items encrypted under a plurality of the key management blocks.

5. The method of claim 1, further comprising:
using a device's assigned device keys to decrypt the digital content items encrypted under key management blocks associated with the device's assigned device keys.

6. The method of claim 5, further comprising:
applying the device's assigned device keys to the associated key management blocks to compute a management key for each key management block.

7. The method of claim 6, further comprising imposing one or more levels of indirection.

8. The method of claim 7, further comprising using each computed management key to compute a title key.

9. The method of claim 1, wherein the distribution medium comprises a physical medium.

10. The method of claim 1, wherein the distribution medium comprises a broadcast medium.

11. A method, comprising:
configuring at least one processor device to perform the functions of:
selecting a plurality of digital content items provided on a single distribution medium;
retrieving a plurality the key management blocks each associated with a different group of user device keys corresponding to each digital content item;
searching for the user device keys from a same key space as the retrieved key management blocks to decrypt encrypt digital content items provided together on said distribution medium;
identifying a subset of digital content items for which a user device key is found for each key management block; and
selectively decrypting the subset of digital content items by using the user device keys to provide user devices selective access to the digital content items provided on said distribution medium.

12. The method of claim 11, further comprising sequentially processing the content items.

13. The method of claim 11, further comprising sequentially processing the key management blocks for each content item according to a predetermined sequence.

14. The method of claim 11, wherein attempting to decrypt the subset of content items comprises applying the device keys to the associated key management blocks to derive a management key and using the derived management key to attempt to decrypt the content items.

15. The method of claim 11, wherein retrieving the key management blocks associated with each content item comprises accessing a mapping between the content items and the associated key management blocks.

16. A computer program product embodied in a non-transitory computer readable storage medium having computer program code when executed by at least one processor, for selectively decoding encrypted data, by performing the functions of:
selecting a plurality of digital content items provided on a single distribution medium;
retrieving a plurality of key management blocks each associated with a different group of user device keys corresponding to each digital content item;
searching for the user device keys from a same key space as the retrieved key management blocks to decrypt encrypted digital content items provided together on said distribution medium;
identifying a subset of digital content items for which a user device key is found for each key management block; and
selectively decrypting the subset of digital content items by using the device keys to provide user devices selective access to the digital content items provided on said distribution medium.

17. The computer program product of claim 16, further comprising computer program code for sequentially processing the content items.

18. The method of claim 11, further comprising sequentially processing the key management blocks for each content item according to a predetermined sequence.

19. The method of claim 11, wherein attempting to decrypt the subset of content items comprises applying the device keys to the associated key management blocks to derive a management key and using the derived management key to attempt to decrypt the content items.

20. The method of claim 11, wherein retrieving the key management blocks associated with each content item comprises accessing a mapping between the content items and the associated key management blocks.

* * * * *